No. 750,240. PATENTED JAN. 19, 1904.
B. BRIELMAIER.
FIRE ESCAPE.
APPLICATION FILED JUNE 22, 1903.
NO MODEL.
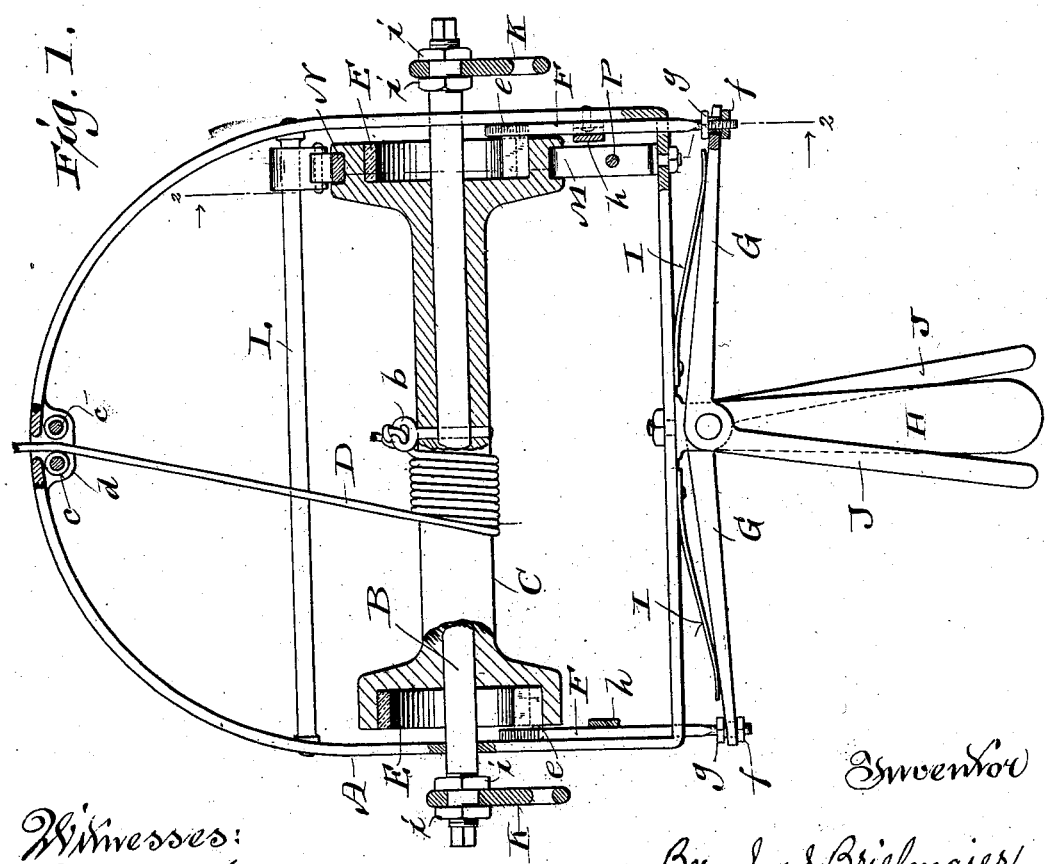

No. 750,240.                                              Patented January 19, 1904.

UNITED STATES PATENT OFFICE.

BERNHARD BRIELMAIER, OF MILWAUKEE, WISCONSIN.

FIRE-ESCAPE.

SPECIFICATION forming part of Letters Patent No. 750,240, dated January 19, 1904.

Application filed June 22, 1903. Serial No. 162,476. (No model.)

*To all whom it may concern:*

Be it known that I, BERNHARD BRIELMAIER, a citizen of the United States, and a resident of Milwaukee, in the county of Milwaukee and State of Wisconsin, have invented certain new and useful Improvements in Fire-Escapes; and I do hereby declare that the following is a full, clear, and exact description thereof.

The improvements consist in certain peculiarities of construction and combination of parts hereinafter particularly set forth with reference to the accompanying drawings and subsequently claimed; the object of the invention being to provide simple, economical, and efficient portable machines of the kind generally known as "fire-escapes" and which are designed to facilitate descent from upper floors or stagings of a building.

Figure 1 of the drawings represents a side elevation of a machine in accordance with my invention, partly in section; and Fig. 2, a transverse section view of the same, this view being indicated by lines 2 2 in the first figure.

Referring by letter to the drawings, A indicates a continuous strap-iron frame that is herein shown angular at the lower end and bowed at the upper end. Loose in side apertures of the frame is a spindle B, and fastened on the spindle by a pin $b$ or other suitable means is a spool C for a cable D, one end of this cable being secured to the spool. The cable extends from the spool through a central eye in the upper end of the frame A to be attached to any suitable stationary object, and said cable is guided by antifriction-rollers $c$, suspended between inwardly-extending upper flanges $d$ of said frame. Annular recesses in the ends of the spool C are engaged by split spring-rings E, the extremities of which are thickened toward the spindle B and laterally extended outside of said recesses. The split rings are normally loose enough in the end recesses of the spool as not to interfere with free rotation of said spool and the spindle to which it is fastened. The outer lateral extensions $e$ of the split spring-rings are separated by upper wedge ends of vertical spreaders F, having lower screw ends adjustably coupled by nuts $f\ g$ to arms G of bell-crank levers that are pivotally connected to a handle H, made fast to the lower end of the frame A to depend therefrom central of the same, the sides of said frame being provided with guides $h$ for the spreaders. Each of the nuts $f$ is flanged and made to engage an eye in the corresponding lever-arm G, this arm being held between said nut and its companion nut $g$ against the free end of a leaf-spring I, the other end of the spring being fastened to the adjacent frame. The other arms J of the bell-crank levers extend downward at angles in opposite directions to the frame-handle H, and being swung inward, when grasped with said handle, they operate to elevate the spreaders F, and thereby cause a spread of the split spring-rings E in the end recesses of the spool C to clutch said spool and retard unwinding of the cable D, this operation being against resistance of the springs I, whereby if the operator relax his grip said levers and spreaders will automatically move toward normal position.

Loose on the ends of the spindle B, between nuts $i$, are hangers K for a sling, (not shown,) in which the operator of the machine is supported, and the ends of said spindle are made angular to take a key or crank by which it is turned to cause winding of the cable D on the spool C aforesaid.

In connection with the lower end of the frame A and a bar L, supported in said frame above the spool C, is one section M of a hand-brake fitting an annular outer groove of said spool. The other section N of the band-brake is hinged to the upper end of the one aforesaid, and its vertically-disposed lower end is provided with an aperture through which a shouldered screw P extends. The screw has its bearing in the vertically-disposed lower end of the band-brake section M, and by adjustment of said screw the tension of the brake is regulated to compensate for the weight of the operator of the machine, the descending speed of said machine and operator being controlled by the friction of said brake and the split spring-rings E above specified.

Having thus described my invention, what I claim as new, and desire to secure by Letters Patent, is—

1. A fire-escape comprising a frame having bell-crank levers in pivotal suspension therefrom, a spindle having its bearings in sides of the frame, a spool fast on the spindle, a cable connected at one end to the spool and guided through an upper eye in said frame, spool-clutches, means in connection with said levers for actuating the clutches, means for a sling in connection with the machine, and a spool-brake adjustable as the tension in proportion to weight of an operator in the sling.

2. A fire-escape comprising a frame having bell-crank levers in pivotal suspension therefrom, a spindle having its bearings in sides of the frame, a spool fast on the spindle, a cable connected at one end of the spool and guided through an upper eye in said frame, spool-clutches, means in connection with said levers for actuating the clutches, springs arranged to oppose the clutching throw of the aforesaid levers, means for attaching a sling in connection with the machine, and a spool-brake adjustable as to tension in proportion to weight of an operator in the sling.

3. A fire-escape comprising a frame having bell-crank levers in pivotal suspension therefrom, a spindle having its bearings in sides of the frame, a spool fast on the spindle, a cable connected at one end to the spool and guided through an upper eye in said frame, split spring-rings engaging end recesses in the spool, ring-spreaders in connection with said levers, means for attaching a sling in connection with the machine, a band-brake consisting of a stationary section and a hinged section arranged in the aforesaid frame, to encompass the spool, and a set-screw adjustable in connection with the brake to regulate the tension of the same.

In testimony that I claim the foregoing I have hereunto set my hand, at Milwaukee, in the county of Milwaukee and State of Wisconsin, in the presence of two witnesses.

BERNHARD BRIELMAIER.

Witnesses:
N. E. OLIPHANT,
E. W. HELLER.